United States Patent
Cornejo Lizarralde et al.

(10) Patent No.: US 9,118,405 B2
(45) Date of Patent: Aug. 25, 2015

(54) SOUND SUPPRESSION SYSTEM AND CONTROLLED GENERATION OF SAME AT A DISTANCE

(71) Applicants: Alberto Cornejo Lizarralde, Atizapan de Zaragoza (MX); Michael A. Digregorio, Atizapan de Zaragoza (MX)

(72) Inventors: Alberto Cornejo Lizarralde, Atizapan de Zaragoza (MX); Michael A. Digregorio, Atizapan de Zaragoza (MX)

( * ) Notice: Subject to any disclaimer, the term of this patent is extended or adjusted under 35 U.S.C. 154(b) by 282 days.

(21) Appl. No.: 13/707,462

(22) Filed: Dec. 6, 2012

(65) Prior Publication Data

US 2013/0230188 A1    Sep. 5, 2013

(30) Foreign Application Priority Data

Mar. 2, 2012  (MX) ................ MX/u/2012/000105 U

(51) Int. Cl.
| | |
|---|---|
| H03B 29/00 | (2006.01) |
| H04B 15/00 | (2006.01) |
| H03G 3/00 | (2006.01) |
| G10K 15/08 | (2006.01) |
| G10K 11/175 | (2006.01) |
| G10L 21/0208 | (2013.01) |
| G10H 1/02 | (2006.01) |

(52) U.S. Cl.
CPC .............. *H04B 15/00* (2013.01); *G10K 11/175* (2013.01); *G10K 15/08* (2013.01); *G10H 1/02* (2013.01); *G10L 2021/02082* (2013.01)

(58) Field of Classification Search
None
See application file for complete search history.

(56) References Cited

U.S. PATENT DOCUMENTS

| | | | |
|---|---|---|---|
| 3,987,245 A | 10/1976 | Fasen et al. | |
| 6,934,386 B2 | 8/2005 | Imata | |
| 7,677,353 B2 | 3/2010 | Shinohara et al. | |
| 2002/0172374 A1* | 11/2002 | Bizjak | 381/71.14 |
| 2010/0008519 A1* | 1/2010 | Hayakawa et al. | 381/94.1 |
| 2013/0136266 A1* | 5/2013 | McClain | 381/57 |
| 2014/0241546 A1* | 8/2014 | Matsumoto | 381/86 |

* cited by examiner

*Primary Examiner* — Andrew L Sniezek
(74) *Attorney, Agent, or Firm* — Andrew W. Chu; Craft Chu PLLC

(57) ABSTRACT

A system to suppress sound emerging from speakers and the generation of same at a distance is presented. This system includes devices to handle audio which when manipulated, in their different applications, are capable of reducing or of eliminating the acoustic impact or sound unwanted by people or by the environment. The present system includes a combination of known devices to handle audible signals or sound that allow for the analysis of the characteristics or specifications of sound or for the generation of an identical signal which can be inverted and mixed with the output signal to cancel sound and at the same time to suppress the inverted signal at a distance and in this way to once again generate sound at a distance. Considering the above, the scope of the present invention falls within the scope of the universe to transmit, mix, and suppress sound.

15 Claims, 1 Drawing Sheet

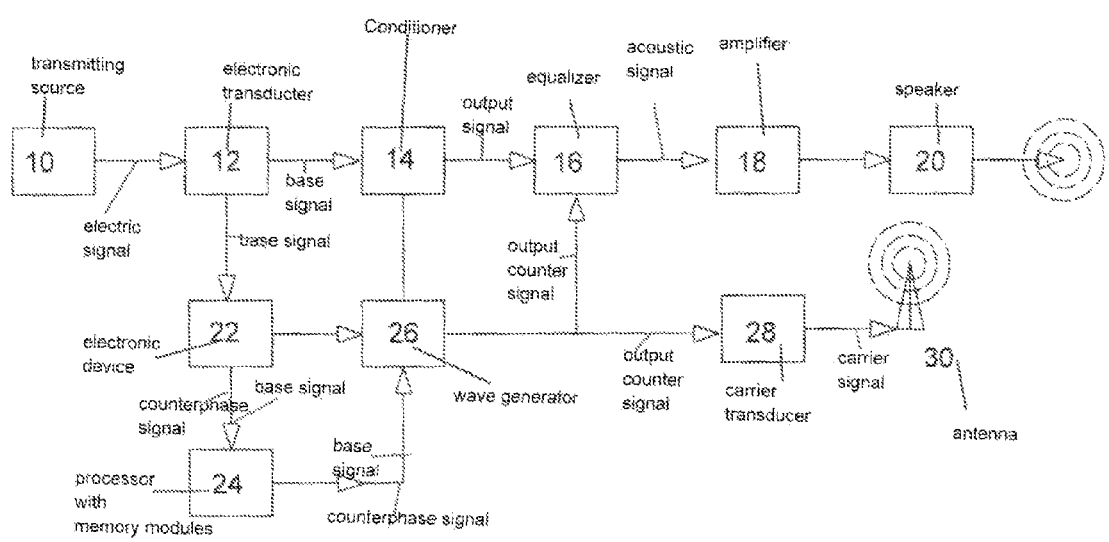

SOUND SUPPRESSION SYSTEM AND CONTROLLED GENERATION OF SAME AT A DISTANCE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

A system to suppress sound from speakers and the generation of same at a distance is presented. Said system includes devices to handle audio which when manipulated, in their different applications, are able to reduce or to eliminate the acoustic impact or sound not wanted by people or by the environment.

The present system comprises a combination of known devices which handle audible or sound signals that allow the user to analyze the characteristics and specifications of sound and to generate an identical signal that can be inverted and mixed with the output signal to cancel sound and at the same time, suppress the inverted signal at a distance and in that way generate the sound at a distance once again.

Considering the above, the scope of the invention falls within the universe of transmission, mixing, and suppression of sound.

2. Description of Related Art Including Information Disclosed Under 37 CFR 1.97 and 37 CFR 1.98.

As known, sound, in physics, is any phenomenon that involves the propagation of elastic waves, whether audible or not through a fluid or media that allows the generation and transmission of the vibratory movement of a body. In particular, sound perceptible to humans consists of sound waves that produce oscillations in air pressure, which are turned into mechanical waves within the human ear, same that are perceived by the brain. Propagation of sound is similar in fluids, where the sound takes the shape of pressure fluctuations. In solid bodies, propagation of sound involves variations in the tensional state of the media.

This propagation of sound involves transportation of energy but without there being transportation of matter, where the vibrations on the air are propagated in the same direction.

Well then, it is frequent to find places where sound is produced by means of mechanical elements assisted by sound reproducing appliances, which are reproduced by means of acoustic speakers, with the maximum power and said power diminishes as it gets farther away from the speakers.

SUMMARY OF THE INVENTION

The proposed system differs from the conventional process, because its objective is to control the output of sound in the speakers, the propagation of which is done conventionally, but it is heard at the distance the listener wants to hear it; that is, to control the sound in such a way that it is not heard directly from the speakers, but by placing an antenna at a distance from the speaker, it sends a control signal, on real time, in such a way that the sound begins to be heard, and as the result of this, the people located near the speakers do not receive the maximum acoustic intensity of sound thus creating a better atmosphere and allowing, for example, conversations to be carried out without having to increase the volume of their voice.

The sound suppression process controlled by the distance, is completely different from the conventional earphones that nullify noise, same that cancel or reduce all the sound and that are used by those people who have to reduce sound to a minimum, as for example specially when checking airplane turbines or when used in similar operations.

Advantages of the Invention

The sound suppression system controlled at a distance, has an architecture distributed through regulated power sources, electromagnetic spectrum analyzers on real time, parallel processors, dynamic and high speed solid state memories, mathematical coprocessors for calculations and numerical correlations, analysis, generation and correlation of counterphase waves through neuronal nets and diffuse logic circuits, triggering electronic circuits to integrate the counterphase wave to the original sound wave and wireless electronic circuits to cancel the counterphase carrier wave depending on the desired distance, audio amplifiers, mixers and equalizers, relational databases and interactive high efficiency man machine interphases.

This controlled sound suppression system, operates on real time, yet, if the sound program is previously known, as in a concert, the efficiency of the suppression of unwanted sound can increase noticeably, because the propagation of counterphase waves can be programmed milliseconds in advance.

This sound suppression system can be activated or controlled for each speaker or by system, as desired, and the sound waves can also be silenced at the desired distance, achieving with this the distribution of sound exclusively in the selected zone or zones, without bothering other groups of people with an unwanted sound.

This sound suppression system can be controlled individually, by zones or by the selected acoustic power, for example, in a wedding party high intensity sound areas could be established such as in the dance floor and the sound could be softly reduced as it moves away from it, thus allowing people to engage in conversation without difficulty, regardless of where the band, the speakers and the acoustic power of the equipment is located.

This controlled sound suppression system can also include specific control devices on each table in a party or gathering so that the guests at each table can, at their discretion, set the level of sound they wish to listen to and not interfere with the others.

This controlled sound suppression system can also be combined with several amplifiers and conventional equipment to have in a gathering, night club, or party, different types of music by zone simultaneously without interfering with the others, such as a band zone, a rock zone, a romantic zone, etc.

This controlled sound suppression system can also be used to block or to eliminate frequencies and overtones of infra and ultrasounds, or to isolate typical frequencies of one or several musical instruments at the discretion of the listener, such as strings, wind, metals, etc., achieving with this a controlled acoustic selectivity such as in recording centers and concert halls.

The suppression system can eliminate sectors of the acoustic band such as low pitch (20-256 Hz), medium pitch (256-2 kHz) and high pitch 2 kHz-20 kHz) or it can eliminate instruments and types such as strings, wind, etc.

This system can also control the emergence of sound by speaker, group of speakers, by area or space and control the generation or elimination of ultrasound and infrasound.

In the same manner, the system can cancel a sound that comes from a speaker or from several speakers based on and from its physical location, up to a controlled distance where the sound coming from the up to then mute speakers begins to be heard.

BRIEF DESCRIPTION OF THE DRAWINGS

FIG. 1 is a schematic view of a diagram of the basic arrangement of direction of the sound process from its origin to its delivery and of the arrangement of the devices that allow the suppression of sound and the controlled generation of same at a distance.

DETAILED DESCRIPTION OF THE DRAWINGS

Using said diagram as a reference, we have that the basic arrangement for the emission of sound from its origin to its delivery includes a combination of a transmitting source (10) which is generally produced by using discs, magnetic tapes or similar media, which are read and which generate an electric signal that is sent to an electronic transducer (12) the function of which is to turn sound waves to a high sensitivity analogical and/or digital signal, response time and resolution; this analogical or digital signal is first electro-acoustically conditioned at the point (14) which represents the conditioning; this wave is transmitted to an equalizer (16) or mixer.

Well then, the system at the point which includes the electronic transducer (12) also sends the signal to a conventional electronic device (22) which performs a metric spectrum analysis on to the original or base signal, to determine the frequencies and the harmonics which are present, with these values the corresponding qualitative and quantitative correlation is done, same that is necessary so the two waves, the original wave and the generated counterphase, are integrated in the one signal that is sent, so that they are compatible and that they go out through some speakers (20).

This equalizer and/or mixer (16) of the existing signals receive the counterphase carrier signal which enables the control of suppression by distance.

The signal that the equalizer or mixer (16) generates goes through filters and selective amplifiers (18) necessary to tune in and to couple power, impedance, resonance, and reverberation, to achieve the maximum quality of the acoustic signal with a minimum or energy consumption.

The speaker with a transducer (20) represents any type of low inertia speaker that produces the resulting sound signal.

Meanwhile, the signal coming from the electronic transducer (12) goes to a set of parallel high speed processors (24) where the digital memories include databases of different instruments and arrangements, with their base frequencies, pitch, sub-pitch, etc. The software that recognizes acoustic patterns which was developed for this application, allows the user, on real time, to learn about the parameters of the original sound, its composition and its projection or trend so that he can anticipate to its reception. Then, one or several sound waves are created; these are in counterphase to the original and are generated on real time. This software has the necessary dynamic interphases for a selective and controlled analysis.

In the same manner, said signal coming from the electronic transducer (12) is simultaneously sent to a wave generator (26) which generated the resulting counterphase waves after the original sound wave was analyzed and processed.

At the same time, the output signal from the counterphase wave generator (26) is sent both to the equalizer and or mixer (16) and simultaneously to a transducer represented by (28) where the carrier signal is turned into a wireless carrier signal and integrates a discharger or electronic trigger which can control the emergence of sound coming from the speakers at the selected distance. (30) represents a selective wireless transmission antenna, that is to be used depending on the type of control by distance or by zone that is to be covered, such as unidirectional, directional, etc.

This counterphase wave generator operates with a sound pressure on air that is kept below or equal to 100 db.

The operating principle for the sound suppression process controlled at a distance is based on the previous analysis (22), on real time, of the sound sent to the amplifiers (18) and/or speakers (20) and its correlation with the generation of counterphase waves (24) and (26) which eliminate the original wave as long as it does not receive a control wave that suppresses sound, (28) control at a distance from the speaker(s) in which the sound wave should "brake" so to speak silence, is regulated by a counterphase carrier wave that can do it from the control console itself of the existing conventional equipment or with the additional equipment that is attached to do so.

The controlled sound suppression system at a distance, utilizes nanocomponent technology and software that recognizes interactive voice and music patterns, that act jointly by means of parallel processes on real time, highly efficient and reliable, to create, generate and inject in the original sound wave, a counterphase wave that travels together with the first and which can be cancelled once the triggering signal from the control equipment is received, depending on the desired distance.

The purpose of the system described in FIG. 1 is to suppress unwanted sound on real time, coming from conventional speakers and/or amplifiers (20) that substantially reduces the impact on the ecological environment and on the people involved, additionally reducing power consumption. This description represents the main characteristics of a process to suppress unwanted sound and some of its optional aspects, conventional devices can also be understood from the drawings in which the ranges and sub-ranges of the values are references and are part of the scope of the novelty.

In the same manner, the description does not intend to represent the only way in which the system can be built, assembled, operated or used, therefore, the purpose of this description is only to illustrate the process and the operation of the system, nevertheless, it should be mentioned that different arrangements of the configuration, operation, control and interrelation of the components or subsequent processes can produce similar results, but not innovating or original, consequently all of those variations are included in the scope of this description. At the same time, it is also understood that the number of equipment and/or of stages of the devices, as well as the technology employed for its realization are a version that included the scope of this application, where the specific characteristics of the equipment are described, same must be interpreted as applicable to other arrangements, where same are compatible.

The devices described herein can be used in a number of potential applications because of the capability they have to be proportionally upgraded, to their capability to be adjusted dimensionally to the silence zone(s) depending on the limitations of space, size and desired function, as well as to the fact that they can be easily placed where the suppression of sound is wanted. More specifically, this process can be applied to any arrangement or layout of amplifiers and speakers, to the geometry of the area, to open and closed areas such as stadiums, individually, as a group or as a set. This system optimizes because of its design the acoustic power necessary in an installation, characteristic that has repercussion in saving energy and in addition it substantially reduces the sound impact that contaminates the environment.

Suppression of sound can be as precise as the components and the geometry of the area allow, because there are always acoustic rebounds and resonance on floors, ceilings and walls that impede 100% efficiency.

Transmission antennas are capable of handling and controlling frequencies within the human range between 20 and 20 kHz, and the distance range to be controlled varies between 0 and 200 meters from the speakers, and where the level of the sound pressure on the air is less or equal to 100 db.

We claim:

1. A system for sound suppression and controlled generation of sound at a distance, said system comprising:
    a transmitting source generating an electric signal;
    an electronic transducer being in communication with said transmitting source and converting said electric signal into a base signal;
    a conditioner being in communication with said electronic transducer and producing an output signal based on said base signal;
    an electronic device being in communication with said electronic transducer and performing a metrical spectrum analysis of said base signal so as to determine a counterphase signal, said counterphase signal being compatible and equalized to said base signal;
    a parallel high speed distributed processor in communication with said electronic device so as to receive said base signal and said counterphase signal;
    a plurality of digital memory modules, each module containing databases of characteristics of different instruments and arrangements, said memory modules being in communication with said parallel high speed distributed processor, wherein said parallel high speed distributed processor compares said base signal to said characteristics;
    a counterphase wave generator being in communication with said parallel high speed distributed processor and said electronic device so as to produce an output counter signal based on said counterphase signal determined by said electronic device;
    an equalizer being in communication with said conditioner and said counterphase wave generator, said equalizer receiving said output signal from said conditioner and said output counter signal from said counterphase wave generator and producing an acoustic signal comprised of said output signal and said output counter signal;
    a carrier transducer being in communication with said counterphase wave generator and producing a carrier signal related to said output counter signal; and
    an antenna placed at a distance from said transmitting source and being in communication with said carrier transducer so as to broadcast a wireless carrier signal, said wireless carrier signal interacting with said acoustic signal so as to control audibility of said output signal within said acoustic signal,
    wherein said base signal has analogical properties, digital properties, responsiveness, and resolution,
    wherein said electronic device determines said counterphase signal by identifying frequencies and overtones of said base signal, and performing corresponding qualitative and quantitative correlation,
    wherein said output signal and said output counter signal are integrated in said acoustic signal by said equalizer, said output signal and said output counter signal being compatible, said acoustic signal being transmitted to a speaker for broadcasting said acoustic signal,
    wherein said databases of said characteristics of different instruments and arrangements are comprised of base frequencies, tones and sub-tones of said different instruments and arrangements,
    wherein said parallel high speed distributed processor recognizes acoustic patterns and parameters of said base signal, said parameters being comprised of constitution, projection in real time, tendency, in real time, to anticipate reception, said counterphase signal being determined in real time,
    wherein said parallel high speed distributed processor performing selective and controlled analysis of said base signal from said electronic device, said base signal being simultaneously transmitted to said conditioner and said electronic device, and
    wherein said wireless carrier signal controls audibility of said output signal within said acoustic signal by at least one of a group consisting of a dispatcher and an electronic trigger, wherein perceived sound coming from said speaker depends on distance from said transmitting source.

2. The system according to claim 1, wherein said antenna in communication with said carrier transducer controls said perceived sound by said speaker with said wireless carrier signal and by distance to from said transmitting source.

3. The system according to claim 1, wherein said antenna in communication with said carrier transducer broadcasts at frequencies corresponding to a range between 20 and 20 kHz.

4. The system according to claim 1, wherein said antenna in communication with said carrier transducer controls said perceived sound at a distance ranging from 0 to 200 meters from said speaker.

5. The system according to claim 1, wherein said counterphase wave generator operates with a sound pressure volume ranging from 0 to 100 db.

6. The system according to claim 1, wherein said counterphase wave generator restricts said output counter signal to a sector of an acoustic band, said sector correspond to at least one of a group consisting of low pitch (20-256 Hz), medium pitch (256-2 kHz), high pitch (2 khz-20 kHz), instrument and instrument type.

7. The system according to claim 1, wherein said wireless carrier signal controls audibility of said output signal within said acoustic signal in a zone defined by distance to said speaker.

8. The system according to claim 1,
    wherein said counterphase wave generator restricts said output counter signal to correspond to said perceived sound of at least one of a group consisting of: ultrasound and infrasound.

9. The system according to claim 1,
    wherein said counterphase wave generator restricts said output counter signal to correspond to said perceived sound at a controlled distance, said perceived sound being comprised of at least one of group consisting of silence and said output signal.

10. The system according to claim 1, wherein said perceived sound is cancelled at a controlled distance.

11. The system according to claim 1, wherein said perceived sound is controlled at different distances, said perceived sound being different at different distances.

12. The system according to claim 1, wherein said perceived sound is controlled at different distances, said perceived sound being silence at different distances.

13. The system according to claim 1, wherein said counterphase wave generator produces a plurality of output counter signals based on said counterphase signal determined by said electronic device, each output counter signal corresponding a different distance from said speaker.

14. The system according to claim 1, wherein said electronic transducer excludes electric signals of mixed media electrical signals from said base signal.

15. A system for sound suppression and controlled generation of sound at a distance, said system comprising:

a transmitting source generating an electric signal;

an electronic transducer being in communication with said transmitting source and converting said electric signal into a base signal;

a conditioner being in communication with said electronic transducer and producing an output signal based on said base signal;

an electronic device being in communication with said electronic transducer and storing a metrical spectrum analysis of a previous base signal so as to determine a counterphase signal, said counterphase signal being compatible and equalized to said previous base signal, wherein a parallel high speed distributed processor in communication with said electronic device receives said previous base signal, and wherein a plurality of digital memory modules, each module containing databases of characteristics of different instruments and arrangements, are in communication with said parallel high speed distributed processor, said parallel high speed distributed processor previously comparing said previous base signal to said characteristics;

a counterphase wave generator being in communication with said electronic device so as to produce an output counter signal based on said counterphase signal stored by said electronic device;

an equalizer being in communication with said conditioner and said counterphase wave generator, said equalizer receiving said output signal from said conditioner and said output counter signal from said counterphase wave generator and producing an acoustic signal comprised of said output signal and said output counter signal;

a carrier transducer being in communication with said counterphase wave generator and producing a carrier signal related to said output counter signal; and an antenna placed at a distance from said transmitting source and being in communication with said carrier transducer so as to broadcast a wireless carrier signal, said wireless carrier signal interacting with said acoustic signal so as to control audibility of said output signal within said acoustic signal.

* * * * *